April 27, 1965          J. W. ARPIN          3,180,171
THERMOPLASTIC RESIN COVERED GEAR AND METHOD OF MAKING SAME
Filed March 6, 1962
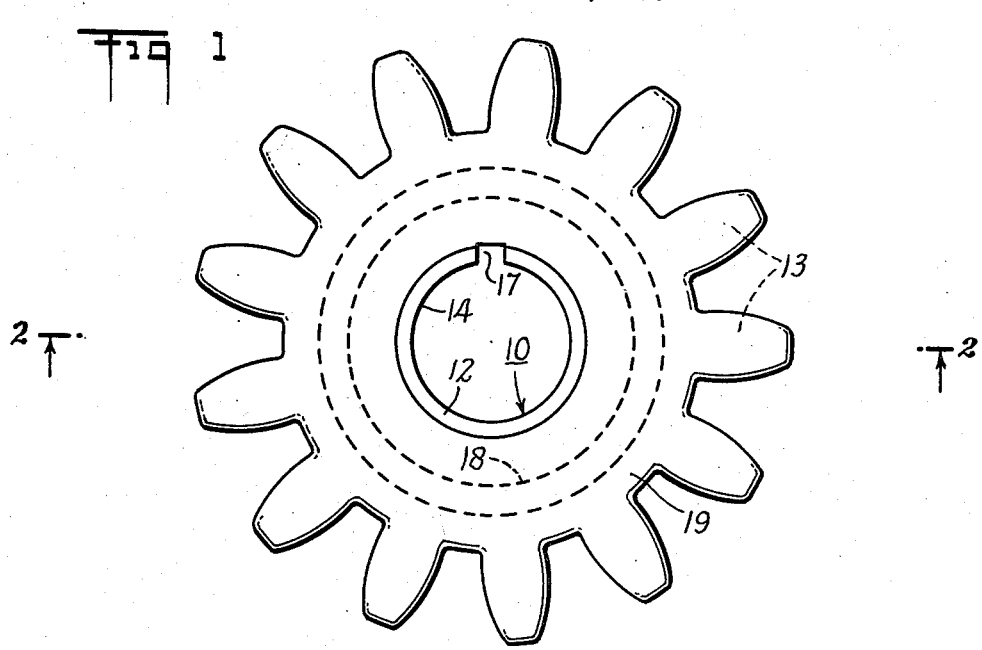
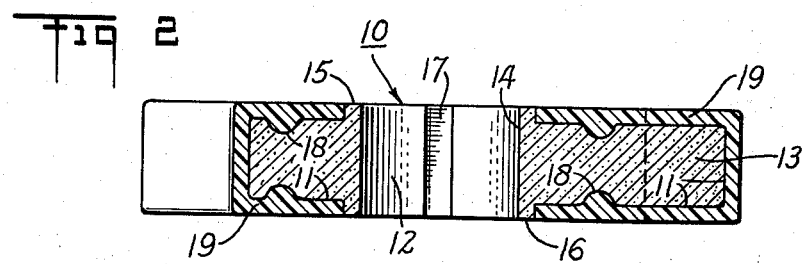
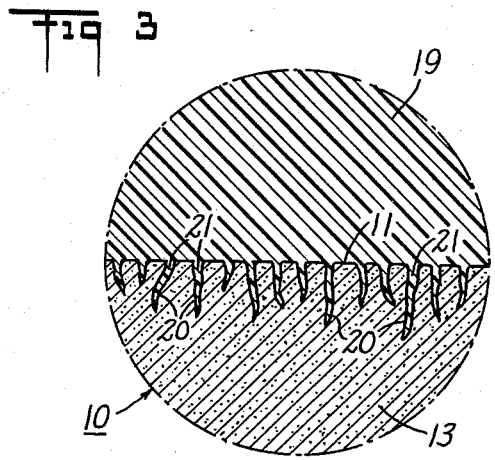
INVENTOR
John W. Arpin
BY
George E. Lilly
AGENT

United States Patent Office 3,180,171
Patented Apr. 27, 1965

3,180,171
THERMOPLASTIC RESIN COVERED GEAR AND
METHOD OF MAKING SAME
John W. Arpin, Bainbridge, N.Y., assignor to American
Plastics Corporation, New York, N.Y., a corporation
of New York
Filed Mar. 6, 1962, Ser. No. 177,764
3 Claims. (Cl. 74—460)

This invention relates to thermoplastic resin covered metal gears and to a method for their production. This invention also incorporates the means for securing the thermoplastic resin coating to the metal gear blank.

Thermoplastic resin covered gears have found use in those applications where there is a need for gears having the strength of metal gears as well as the good bearing qualities, quietness, toughness, and other desirable properties of plastic gears. Previous attempts to prepare such gears have generally been unsuccessful because under the conditions of use the thermoplastic resin coatings tend to separate from the metal gear blanks.

This invention provides a novel combination of a porous-surfaced metal gear blank and a thermoplastic resin covering for the tooth section of the gear blank and means for securing the members together to withstand the forces that ordinarily cause their separation.

An object of this invention is to provide a new and improved thermoplastic resin covered metal gear and the means for bonding these members together.

It is a further object to provide a method of forming a gear including a metal gear blank and a thermoplastic resin covering for the tooth section of the blank which are securely bonded together.

These and other objects and advantages of the present invention will be apparent from the hereinafter detailed description and appended claims when read in conjunction with the accompanying drawing.

In said drawing—

FIG. 1 is a view in elevation of a thermoplastic resin covered gear embodying the present invention.

FIG. 2 is a cross-sectional view of the gear taken on the line 2—2 of FIG. 1.

FIG. 3 is a greatly magnified fragmentary sectional view of the boundary between the thermoplastic resin coating and the porous-surfaced metal blank.

Generally stated the method of this invention comprises a resin molding operation in which an undersized metal gear blank having a porous surface is placed in a cavity in one die of a mold, a second die is moved into a coating relation with the first die to close the mold, the cavity being the size and shape of the thermoplastic resin covered gear, and a thermoplastic resin is molded around the tooth section of the gear blank.

The molding can be accomplished by introducing molten resin into the mold cavity or by heating the resin after its has been introduced into the cavity. During the molding operation the molten resin flows into the pores and crevices in the surface of the gear blank thereby mechanically interlocking the resin coating with the gear blank.

The thermoplastic resin covered metal gears of this invention are characterized by excellent adhesion of the thermoplastic resin coating to the metal gear blank. In addition these gears are stronger than solid plastic gears and demonstrate many of the advantages of plastic gears; that is, they have a relatively low coefficient of friction, they show little back-lash, and they operate quietly and with little vibration.

Referring now more particularly to the drawing, 10 shows a metal gear blank having a porous surface 11 and including a hub section 12 and a tooth section 13. The gear blank has a generally cylindrical opening therethrough as at 14 and a pair of end faces 15 and 16. The hub section includes a keyway 17 or other means of determining tooth position which is used to position the blank in the cavity of the mold. The tooth section of the gear blank includes an indeterminate number of teeth, the number being dependent upon the characteristics of the gear. This section also contains at least one concentric groove 18 in each end face. The thermoplastic resin coating 19 extends in a thin layer over the tooth section of the gear blank and into the concentric grooves to provide a mechanical bond between the metal blank and the coating.

The desired interlocking of the resin coating with the porous-surfaced metal blank occurs when the molten resin flows into the pores or crevices 20 in the surface of the blank and on cooling forms projections 21 that securely bond the coating to the metal blank.

In order to obtain the advantages of the present invention it is necessary that the metal gear blank have a porous surface. Suitable surfaces may be produced by the selective etching or other treatment of metal gear blanks. Ordinarily and preferably the porous-surfaced gear blanks are obtained by sintering metallic powders, particularly those having a copper-base composition.

The thermoplastic resins that may be used in the production of the novel gears include nylon, polyacetal resins, polyolefins, polycarbonates, cellulose esters, polyvinyl halides, and the like, with the choice of the resin used in each application depending upon the properties desired in the product. For example, when the thermoplastic resin covered gears are to be used in an automobile engine, nylon or a polyacetal is used since these resins are resistant to attack by gasoline and petroleum oils.

It is to be understood that this invention is not limited to the particular embodiments hereinbefore described and that it also relates to pinions, racks, helical gears, bevel gears, worm gears, and other toothed members which comprise a porous-surfaced metal blank and a thermoplastic resin coating for at least a portion of said blank and to their production by the method hereinbefore described.

What is claimed is:

1. A thermoplastic resin covered gear comprising a porous-surfaced metal gear blank having a hub section and a tooth section and a thermoplastic resin coating for said tooth section, said coating extending into the pores of said gear blank.

2. A thermoplastic resin covered gear comprising a porous sintered metal gear blank having a hub section and a tooth section and a thermoplastic resin coating for said tooth section, said coating extending into the pores of said gear blank.

3. A thermoplastic resin covered gear comprising a porous sintered metal gear blank having a hub section and a tooth section, said blank having in said hub section a means for locating tooth position and in each end face of said tooth section at least one concentric groove, and a thermoplastic resin coating for said tooth section, said coating extending into the pores of said gear blank.

References Cited by the Examiner
UNITED STATES PATENTS

| | | | |
|---|---|---|---|
| 1,253,294 | 1/18 | Starker | 74—460 |
| 1,765,231 | 6/30 | Haas | 74—460 |
| 2,137,986 | 11/38 | Sanford. | |
| 2,561,579 | 7/51 | Lenel | 74—434 |
| 2,720,119 | 10/55 | Sherman | 74—460 |
| 2,980,966 | 4/61 | Praeg. | |

DON A. WAITE, *Primary Examiner.*

WILLIAM J. STEPHANSON, *Examiner.*